United States Patent [19]

Pellegrini

[11] Patent Number: 4,494,054

[45] Date of Patent: Jan. 15, 1985

[54] ELECTRIC POWER DELIVERY SYSTEM AND METHOD

[76] Inventor: Gerald N. Pellegrini, 7 Ventura Rd., Worcester, Mass. 01604

[21] Appl. No.: 484,178

[22] Filed: Apr. 13, 1983

[51] Int. Cl.³ .............................................. H02P 5/16
[52] U.S. Cl. .................................. 318/254; 318/244
[58] Field of Search ......... 318/345 LB, 334, 800–811, 318/681, 254, 244, 439; 363/131–133, 37, 40, 41, 13, 16, 135–137

[56] References Cited

U.S. PATENT DOCUMENTS

| | | | |
|---|---|---|---|
| 3,560,838 | 2/1971 | Weixelman | 363/132 |
| 3,588,650 | 6/1971 | Bevis | 318/810 |
| 4,238,717 | 12/1980 | Knight et al. | 318/703 |
| 4,446,406 | 5/1984 | Uzuka | 318/696 |
| 4,459,519 | 7/1984 | Erdman | 318/334 |

OTHER PUBLICATIONS

An Electronically Commutated Brushless D.C. Motor Applied to a Total Artificial Heart by J. L. Orth, M. S. Isaacson, K. R. Carr, S. D. Nielsen, and R. K. Jarvik.
Back EMF Controls dc Motor Speed, Electronics in Design, by R. F. Stengel, Western Editor.
Electronics/Feb. 1, 1973, p. 100 by Don DeKold.

*Primary Examiner*—E. A. Goldberg
*Assistant Examiner*—A. Evans

[57] ABSTRACT

A power control that delivers electrical power to a A.C. motor at a frequency which is controlled by the motor speed itself without the need for any separate speed sensing circuit. The power control accomplished this by allowing a small second current to flow from motor terminals of higher electrical potential to motor terminals of lower electrical potential, and then to provide means for the second current to cause current to flow from the power source through the motor terminals in the direction opposed to the motor terminal potentials thereby supplying electrical power to the motor.

48 Claims, 1 Drawing Figure

4,494,054

ELECTRIC POWER DELIVERY SYSTEM AND METHOD

BACKGROUND OF THE INVENTION

The present invention relates to the art of supplying and controlling electrical power to an electromechanical device or motor which converts electrical energy to mechanical energy to produce work. The invention however is not limited to devices which produce mechanical power since the invention concerns the apparatus and method of delivering electrical power generally.

The prior art of electric motor controls consists of either using an alternating current or A.C. electromechanical device or motor together with an A.C. drive control or using a direct current or D.C. motor together with a D.C. drive control. Speed control in the first case generally is accomplished by varying the voltage and frequency of the electrical power supplied to the A.C. motor. Speed control in the second case is accomplished by varying the voltage supplied to the D.C. motor. A.C. controls are however more costly and complicated than the D.C. motor controls. The cost of A.C. control systems is not prohibitive however since the cost of an A.C. motor is generally less than an equivalent D.C. motor and the combination of an A.C. control with an A.C. motor is competitive with the combination of a D.C. control with a D.C. motor. The improvement presented here is an attempt to reduce the cost and complication of motor drive systems generally by the use of a simple electrical circuit apparatus, and an A.C. motor or device.

SUMMARY OF THE INVENTION

The present invention involves an electrical circuit apparatus which can be used with an A.C. synchronous motor in such a way as to deliver electrical power to the A.C. motor from an electrical power source and in which the speed of the A.C. motor is controlled solely by the source voltage. The present invention also delivers electrical power to the A.C. motor at a frequency which is controlled by the motor speed itself without the need for any separate speed sensing circuit. The present invention accomplishes this by allowing a small second current to flow from motor terminals of higher electrical potential to motor terminals of lower electrical potential, and then to provide means for the second current to cause current to flow from the power source through the motor terminals in the direction opposed to the motor terminal potentials thereby supplying electrical power to the motor.

DETAILED DESCRIPTION OF INVENTION

Figure 1:
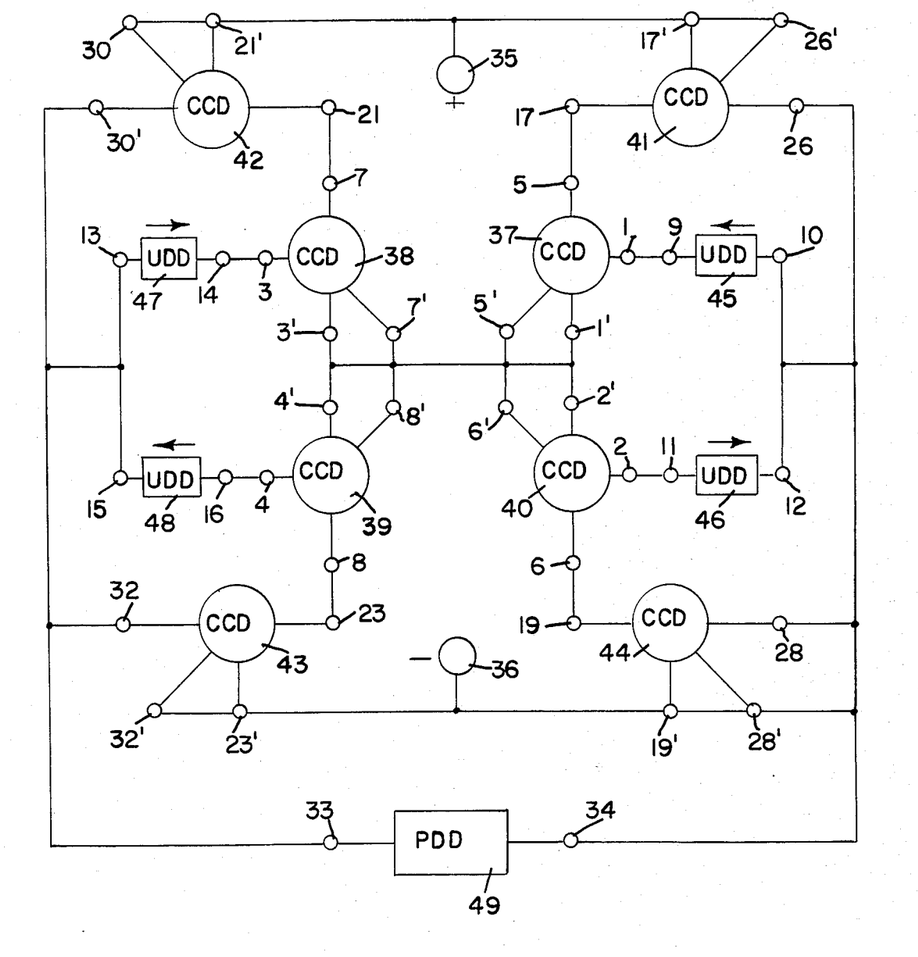
The drawing is a schematic drawing of electrical apparatus showing connections with numbered terminals between current control devices hereafter referred to as CCD, unidirectional devices hereafter referred to as UDD and an electric power converting device hereafter referred to as PDD. The electrical power source and various other electrical components such as resistors are not included in the drawing since they are not required for an adequate description of the invention. Also for simplicity the drawing and the description represent single phase operation from a direct current source since it can be easily modified to operate in polyphase from an alternating current source. The terminals of the CCD's are labeled with numbers and their primes in order that one can say the current in the circuit through 3 and 3' controls or allows the current in the circuit through 7 and 7' in CCD 38. Arrows above the UDD's will indicate the allowable current direction through the UDD.

The description is set forth in the following. When in operation electrical power is transmitted to the PDD 49 from a source through terminals 35 and 36. The direction of the electrical current through PDD 49 is opposite to and determined by the electrical potential across terminals 33 and 34 of PDD 49. To show this we will describe the situation when terminal 34 is at a higher electrical potential than terminal 33 of PDD 49. Electric current will flow from terminal 34 to terminal 10 of UDD 45 thence to terminal 9 of UDD of because of the preferred direction of UDD 45 as indicated in drawing. The current then flows through CCD 37 by terminals 1 and 1' and thence through CCD 39 by terminal 4' and 4 thence to terminal 16 of UDD 48 thence to terminal 15 of UDD 48 because of its preferred direction thence to terminal 33 of PDD 49 thereby completing the circuit. Current though CCD 37 by terminals 1 and 1' allows current to flow through CCD 37 by terminals 5 and 5' by the nature of the CCD. Likewise current through CCD 39 by terminals 4' and 4 allows current to flow through CCD 39 by terminals 8' and 8. A secondary circuit is formed whereby current flows from terminal 35 to terminal 36, terminal 35 being at a higher electrical potential than terminal 36, through CCD 41 by terminals 17' and 17 thence through CCD 37 by terminals 5 and 5' thence through CCD 39 by terminals 8' and 8 thence through CCD 43 by terminals 23 and 23'. Current through CCD 41 by terminals 17' and 17 allows current to flow through CCD 41 by terminals 26' and 26. Likewise current through CCD 43 by terminals 23 and 23' allows current to flow through CCD 43 by terminals 32 and 32'. A tertiary circuit is formed whereby current flows from terminal 35 to terminal 36 through CCD 41 by terminals 26' and 26 thence through PDD 49 by terminals 34 and 33 thence through CCD 43 by terminals 32 and 32'. Electrical power is transmitted to PDD 49 since electric current is flowing through PDD 49 from a terminal of higher electrical potential to a terminal of lower electrical potential. It can be easily seen from the drawing symmetry that electrical current will flow through PDD from terminal 33 to terminal 34 when terminal 33 is at a higher electrical potential than terminal 34 in the same manner thereby again transmitting electrical power to PDD 49.

The description and drawing could have been made with four CCD's instead of eight by representing pairs of CCD's as single CCD's as for example CCD 37 and CCD 41 could be combined to form a single new CCD where terminals 1' and 5' of CCD 37 would be one terminal of the new CCD, terminals 17' and 26' of CCD 41 would be combined to form a second terminal of the new CCD, and terminals 1 and 26 would be the remaining terminals of the new CCD. Terminals 5 and 17 would not exist in the description. Also it should be understood that three terminal devices such as transistors may be represented by CCD's where two terminals of each CCD would be held in common. The present inventor chose the eight CCD description because it more closely represented the actual working model.

I claim:

1. A method for supplying and controlling the delivery of electric power to an electric power converting device, said device comprising input terminals of differing electrical potentials, and said device converting electric power to some other form of useful power through the agency of an electrical system, said system comprising an electrical apparatus and an electrical power source and sink, said method comprising the acts of;

(a) controlling the source electric current which flows from said source to a higher electrical potential input terminal, where said higher terminal is one of said input terminals, by the sole agency of the potential of same said higher terminal, or (b) controlling the sink electric current which flows from a lower electrical potential input terminal to said sink, where said lower terminal is one of said input terminals, by the sole agency of the potential of same said lower terminal, or (c) controlling the electric current which flows from said source to said higher terminal then through said device to said lower terminal then to said sink, by the sole agency of the potentials of same said higher and said lower terminals.

2. A method as recited in claim 1, also comprising the acts of;

(d) providing for a source control signal by the sole agency of said higher terminal potential, where said source signal controls the said source current, (e) providing for a sink control signal by the sole agency of said lower terminal potential, where said sink signal controls the said sink current, (f) providing for a control signal by the sole agency of said higher and said lower terminal potentials, where said signal controls the said electric current.

3. A method as recited in claim 1, also comprising the acts of;

(g) activating a source enabling means by the sole agency of said higher terminal potential, where said enabling means controls said source current, (h) activating a sink enabling means by the sole agency of said lower terminal potential, where said sink enabling means controls said sink current, (i) activating an enabling means by the sole agency of said higher and lower terminal potentials, where said enabling means controls said current.

4. A method as recited in claim 2, also comprising the acts of;

(j) activating a source enabling means by the sole agency of said source signal, where said source enabling means controls said source current, (k) activating a sink enabling means by the sole agency of said sink signal, where said sink enabling means controls said sink current, (l) activating an enabling means by the sole agency of said control signal, were said enabling means controls said electric current.

5. A method as recited in claim 1, also comprising the acts of;

(m) producing mechanical power by the agency of said device.

6. A method as recited in claim 2, also comprising the acts of;

(m) producing mechanical power by the agency of said device.

7. A method as recited in claim 3, also comprising the acts of;

(m) producing mechanical power by the agency of said device.

8. A method as recited in claim 4, also comprising the acts of;

(m) producing mechanical power by the agency of said device.

9. An electric power delivery system comprising in combination an electrical power source and sink, an electrical apparatus, an electric power converting device, said device converting electrical power to some other form of useful power and said device comprising input terminals of differing electrical potentials, wherein are provided;

(a) means for the potential of a higher electrical potential input terminal to solely control the source electric current which flows from said source to said higher terminal, where said higher terminal is one of said input terminals, or (b) means for the potential of a lower electrical potential input terminal to solely control the sink electric current which flows from said lower terminal to said sink, where said lower terminal is one of said input terminals, or (c) means for the potentials of said higher and lower terminals to solely control the electric current which flows from said source to said higher terminal then through said device to said lower terminal then to said sink.

10. An electric power delivery system as recited in claim 9, wherein are also provided;

(d) a source control signal from said higher terminal potential which solely controls the said source current, (e) a sink control signal from said lower terminal potential which solely controls the said sink current, (f) a control signal from said higher and lower terminal potentials which solely controls the said electric current.

11. An electric power delivery system as recited in claim 9, wherein are also provided;

(g) a source enabling means, which is solely activated by said higher terminal potential, and which controls the said source current, (h) a sink enabling means, which is solely activated by said lower terminal potential, and which controls the said sink current, (i) an enabling means, which is solely activated by said higher and lower terminal potentials, and which controls the said electric current.

12. An electric power delivery system as recited in claim 10, wherein are also provided;

(j) a source enabling means which is solely activated by said source signal, and which controls the said source current, (k) a sink enabling means, which is solely activated by said sink signal, and which controls the said sink current, (l) an enabling means, which is solely activated by said signal, and which controls the said electric current.

13. An electric power delivery system as recited in claim 9, wherein are also provided;

(m) mechanical power by the agency of said device.

14. An electric power delivery system as recited in claim 10, wherein are also provided;

(m) mechanical power by the agency of said device.

15. An electric power delivery system as recited in claim 11, wherein are also provided;

(m) mechanical power by the agency of said device.

16. An electric power delivery system as recited in claim 12, wherein are also provided;

(m) mechanical power by the agency of said device.

17. A method for supplying and controlling the delivery of electric power to an electric power converting device, said device comprising input terminals of differing electrical potentials, and said device converting electric power to some other form of useful power through the agency of an electrical system, said system comprising an electrical apparatus and an electrical power source and sink, said method comprising the acts of;

(a) controlling the source electric current which flows from said source to a higher electrical potential input terminal, where said higher terminal, being one of said input terminals, is at an electrical potential higher in comparison with other input terminals by an amount at least equal to the differences in the potentials associated with each one of said input terminals due to conductive impedances, by the sole agency of the potential of same said higher terminal, or (b) controlling the sink electric current which flows from a lower electrical potential input terminal to said sink, where said lower terminal, being one of said input terminals, is at an electrical potential lower in comparison with other input terminals by an amount of at least equal to the differences in the potentials associated with each one of said input terminals due to conductive impedance, by the sole agency of the potential of same said lower terminal, or (c) controlling the electric current which flows from said source to said higher terminal then through said device to said lower terminal then to said sink, by the sole agency of the potentials of same said higher and said lower terminals.

18. A method as recited in claim 17, also comprising the acts of;

(d) providing for a source control signal by the sole agency of said higher terminal potential, where said source signal controls the said source current, (e) providing for a sink control signal by the sole agency of said lower terminal potential, where said sink signal controls the said sink current, (f) providing for a control signal by the sole agency of said higher and said lower terminal potentials, where said signal controls the said electric current.

19. A method as recited in claim 17, also comprising the acts of;

(g) activating a source enabling means by the sole agency of said higher terminal potential, where said enabling means controls said source current, (h) activating a sink enabling means by the sole agency of said lower terminal potential, where said sink enabling means controls said sink current, (i) activating an enabling means by the sole agency of said higher and lower terminal potentials, where said enabling means controls said current.

20. A method as recited in claim 18, also comprising the acts of;

(j) activating a source enabling means by the sole agency of said source signal, where said source enabling means controls said source current, (k) activating a sink enabling means by the sole agency of said sink signal, where said sink enabling means controls said sink current, (l) activating an enabling means by the sole agency of said control signal, where said enabling means controls said electric current.

21. A method as recited in claim 17, also comprising the acts of;

(m) producing mechanical power by the agency of said device.

22. A method as recited in claim 18, also comprising the acts of;

(m) producing mechanical power by the agency of said device.

23. A method as recited in claim 19, also comprising the acts of;

(m) producing mechanical power by the agency of said device.

24. A method as recited in claim 20, also comprising the acts of;

(m) producing mechanical power by the agency of said device.

25. An electric power delivery system comprising in combination an electrical power source and sink, an electrical apparatus, an electric power converting device, said device converting electrical power to some other form of useful power and said device comprising input terminals of differing electrical potentials, wherein are provided;

(a) means for the potential of a higher electrical potential input terminal to solely control the source electric current which flows from said source to said higher terminal, where said higher terminal, being one of said input terminals, is at an electrical potential higher in comparison with other input terminals by an amount of at least equal to the differences in the potentials associated with each one of said input terminals due to conductive impedances, or (b) means for the potential of a lower electrical potential input terminal to solely control the sink electric current which flows from said lower terminal to said sink, where said lower terminal, being one of said input terminals, is at an electrical potential lower in comparison with other input terminals by an amount of at least equal to the differences in the potentials associated with each one of said input terminals due to conductive impedances, or (c) means for the potentials of said higher and lower terminals to solely control the electric current which flows from said source to said higher terminal then through said device to said lower terminal then to said sink.

26. An electric power delivery system as recited in claim 25, wherein are also provided;

(d) a source control signal from said higher terminal potential which solely controls the said source current, (e) a sink control signal from said lower terminal potential which solely controls the said sink current, (f) a control signal from said higher and lower terminal potentials which solely controls the said electric current.

27. An electric power delivery system as recited in claim 25, wherein are also provided;

(g) a source enabling means, which is solely activated by said higher terminal potential, and which controls the said source current, (h) a sink enabling means, which is solely activated by said lower terminal potential, and which controls the said sink current, (i) an enabling means, which is solely activated by said higher and lower terminal potentials, and which controls the said electric current.

28. An electric power delivery system as recited in claim 26, wherein are also provided;

(j) a source enabling means which is solely activated by said source signal, and which controls the said source current, (k) a sink enabling means, which is solely activated by said sink signal, and which controls the said sink current, (l) an enabling means, which is solely activated by said signal, and which controls the said electric current.

29. An electric power delivery system as recited in claim 25, wherein are also provided;

(m) mechanical power by the agency of said device.

30. An electric power delivery system as recited in claim 26, wherein are also provided;

(m) mechanical power by the agency of said device.

31. An electric power delivery system as recited in claim 27, wherein are also provided;

(m) mechanical power by the agency of said device.

32. An electric power delivery system as recited in claim 28, wherein are also provided;

(m) mechanical power by the agency of said device.

33. A method for supplying and controlling the delivery of electric power to an electric power converting device, said device comprising input terminals of differing electrical potentials, and said device converting electric power to some other form of useful power through the agency of an electrical system, said system comprising an electrical apparatus and an electrical power source and sink, said method comprising the acts of;

(a) controlling the source electric current which flows from said source to a highest electrical potential input terminal, where said highest terminal, being one of said input terminals, is at an electrical potential highest in comparison with other input terminals by an amount at least equal to the differences in the potentials associated with each one of said input terminals due to conductive impedances, by the sole agency of the potential of same said highest terminal, or (b) controlling the sink electric current which flows from a lowest electrical potential input terminal to said sink, where said lowest terminal, being one of said input terminals, is at an electrical potential lowest in comparison with other input terminals by an amount of at least equal to the differences in the potentials associated with each one of said input terminals due to conductive impedances, by the sole agency of the potential of same said lowest terminal, or (c) controlling the electric current which flows from said source to said highest terminal then through said device to said lowest terminal then to said sink, by the sole agency of the potentials of same said highest and said lowest terminals.

34. A method as recited in claim 33, also comprising the acts of;

(d) providing for a source control signal by the sole agency of said highest terminal potential, where said source signal controls the said source current, (e) providing for a sink control signal by the sole agency of said lowest terminal potential, where said sink signal controls the said sink current, (f) providing for a control signal by the sole agency of said highest and said lowest terminal potentials, where said signal controls the said electric current.

35. A method as recited in claim 33, also comprising the acts of;

(g) activating a source enabling means by the sole agency of said highest terminal potential, where said enabling means controls said source current, (h) activating a sink enabling means by the sole agency of said lowest terminal potential, where said sink enabling means controls said sink current, (i) activating an enabling means by the sole agency of said highest and lowest terminal potentials, where said enabling means controls said current.

36. A method as recited in claim 34, also comprising the acts of;

(j) activating a source enabling means by the sole agency of said source signal, where said source enabling means controls said source current, (k) activating a sink enabling means by the sole agency of said sink signal, where said sink enabling means controls said sink current, (l) activating an enabling means by the sole agency of said control signal, where said enabling means controls said electric current.

37. A method as recited in claim 33, also comprising the acts of;

(m) producing mechanical power by the agency of said device.

38. A method as recited in claim 34, also comprising the acts of;

(m) producing mechanical power by the agency of said device.

39. A method as recited in claim 35, also comprising the acts of;

(m) producing mechanical power by the agency of said device.

40. A method as recited in claim 36, also comprising the acts of;

(m) producing mechanical power by the agency of said device.

41. An electric power delivery system comprising in combination an electrical power source and sink, an electrical apparatus, an electric power converting device, said device converting electrical power to some other form of useful power and said device comprising input terminals of differing electrical potentials, wherein are provided;

(a) means for the potential of a highest electrical potential input terminal to solely control the source electric current which flows from said source to said highest terminal, where said highest terminal, being one of said input terminals, is at an electrical potential highest in comparison with other input terminals by an amount of at least equal to the differences in the potentials associated with each one of said input terminals due to conductive impedances, or (b) means for the potential of a lowest electrical potential input terminal to solely control the sink electric current which flows from said lowest terminal to said sink, where said lowest terminal, being one of said input terminals, is at an electrical potential lowest in comparison with other input terminals by an amount of at least equal to the differences in the potentials associated with each one of said input terminals due to conductive impedances, or (c) means for the potentials of said highest and lowest terminals to solely control the electric current which flows from said source to said highest terminal then through said device to said lowest terminal then to said sink.

42. An electric power delivery system as recited in claim 41, wherein are also provided;

(d) a source control signal from said highest terminal potential which solely controls the said source current, (e) a sink control signal from said lowest terminal potential which solely controls the said sink current, (f) a control signal from said highest and lowest terminal potentials which solely controls the said electric current.

43. An electric power delivery system as recited in claim 41, wherein are also provided;

(g) a source enabling means, which is solely activated by said highest terminal potential, and which controls the said source current, (h) a sink enabling means, which is solely activated by said lowest terminal potential, and which controls the said sink current, (i) an enabling means, which is solely activated by said highest and lowest terminal potentials, and which controls the said electric current.

44. An electric power delivery system as recited in claim 42, wherein are also provided;

(j) a source enabling means which is solely activated by said source signal, and which controls the said source current, (k) a sink enabling means, which is solely activated by said sink signal, and which controls the said sink current, (l) an enabling means, which is solely activated by said signal, and which controls the said electric current.

45. An electric power delivery system as recited in claim 41, wherein are also provided;

(m) mechanical power by the agency of said device.

46. An electric power delivery system as recited in claim 42, wherein are also provided;

(m) mechanical power by the agency of said device.

47. An electric power delivery system as recited in claim 43, wherein are also provided;

(m) mechanical power by the agency of said device.

48. An electric power delivery system as recited in claim 44, wherein are also provided;

(m) mechanical power by the agnecy of said device.

* * * * *

UNITED STATES PATENT AND TRADEMARK OFFICE
CERTIFICATE OF CORRECTION

PATENT NO. : 4,494,054

DATED : JANUARY 15, 1985

INVENTOR(S) : GERALD N. PELLEGRINI

It is certified that error appears in the above-identified patent and that said Letters Patent is hereby corrected as shown below:

In the Abstract

"a A.C. motor" should read - an A.C. synchronous motor -

In the Drawing

Cancel connection between point 28' and point 34.

Col. 1  Line 66; after "phase" and before "from" insert -or-

Col. 2  Line 17; after "UDD" and before "because", "of" should read - 45 -

Line 24; "allows" should read - controls or allows -

Line 27; "allows" should read - controls or allows -

Line 35; "allows" should read - controls or allows -

Line 38; "allows" should read - controls or allows -

Col. 3  Line 29; after "signal" and before "by" insert -, being part of said (a) controlling act, -

Line 33; after "signal" and before "by" insert -, being part of said (b) controlling act, -

UNITED STATES PATENT AND TRADEMARK OFFICE
CERTIFICATE OF CORRECTION

PATENT NO. : 4,494,054
DATED : JANUARY 15, 1985
INVENTOR(S) : GERALD N. PELLEGRINI

It is certified that error appears in the above-identified patent and that said Letters Patent is hereby corrected as shown below:

In the Claims

Col. 3   Line 36; after "signal" and before "by" insert -, being part of said (c) controlling act, -

Line 41; after "means" and before "by" insert -, being part of said (a) controlling act, -

Line 44; after "means" and before "by" insert -, being part of said (b) controlling act, -

Line 47; after "means" and before "by" insert -, being part of said (c) controlling act, -

Line 52; after "means" and before "by" insert -, being part of said (a) controlling act, -

Line 55; after "means" and before "by" insert -, being part of said (b) controlling act, -

Line 58; after "means" and before "by" insert -, being part of said (c) controlling act, -

Col. 4   Line 33; after "(d)" and before "a" insert -means, being part of said (a) means, providing for -

Line 36; after "(e)" and before "a" insert -means, being part of said (b) means, providing for -

Line 39; after "(f)" and before "a" insert -means, being part of said (c) means, providing for -

UNITED STATES PATENT AND TRADEMARK OFFICE
CERTIFICATE OF CORRECTION

PATENT NO. : 4,494,054

DATED : JANUARY 15, 1985

INVENTOR(S) : GERALD N. PELLEGRINI

It is certified that error appears in the above-identified patent and that said Letters Patent is hereby corrected as shown below:

Col. 4 Line 44; after "means," and before "which" insert -being part of said (a) means, -

Line 47; after "means," and before "which" insert - being part of said (b) means, -

Line 50; after "means," and before "which" insert - being part of said (c) means, -

Line 55; after "means" and before "which" insert -, being part of said (a) means, -

Line 58; after "means," and before "which" insert - being part of said (b) means, -

Line 61; after "means," and before "which" insert - being part of said (c) means, -

Line 62; "signal" should read - control signal -

Line 66; "mechanical" should read - means providing for mechanical -

Col. 5 Line 1; "mechanical" should read - means providing for mechanical -

Line 4; "mechanical" should read - means providing for mechanical -

Line 7; "mechanical" should read - means providing for mechanical -

UNITED STATES PATENT AND TRADEMARK OFFICE
CERTIFICATE OF CORRECTION

PATENT NO. : 4,494,054
DATED : JANUARY 15, 1985
INVENTOR(S) : GERALD N. PELLEGRINI

It is certified that error appears in the above-identified patent and that said Letters Patent is hereby corrected as shown below:

Col. 5  Line 22; "an amount at least equal to" should read -- amounts greater than --

Line 32; "an amount of at least equal to" should read -- amounts greater than --

Line 44; after "signal" and before "by" insert --, being part of said (a) controlling act, --

Line 47; after "signal" and before "by" insert --, being part of said (b) controlling act, --

Line 50; after "signal" and before "by" insert --, being part of said (c) controlling act, --

Line 55; after "means" and before "by" insert --, being part of said (a) controlling act, --

Line 58; after "means" and before "by" insert --, being part of said (b) controlling act, --

Line 61; after "means" and before "by" insert --, being part of said (c) controlling act, --

Line 66; after "means" and before "by" insert --, being part of said (a) controlling act, --

Col. 6  Line 1; after "means" and before "by" insert --, being part of said (b) controlling act, --

Line 4; after "means" and before "by" insert --, being part of said (c) controlling act, --

UNITED STATES PATENT AND TRADEMARK OFFICE
CERTIFICATE OF CORRECTION

PATENT NO. : 4,494,054
DATED : JANUARY 15, 1985
INVENTOR(S) : GERALD N. PELLEGRINI

It is certified that error appears in the above-identified patent and that said Letters Patent is hereby corrected as shown below:

Col. 6  Line 37; "an amount of at least equal to" should read - amounts greater than -

Line 47; "an amount of at least equal to" should read - amounts greater than -

Line 58; after "(d)" and before "a" insert -means, being part of said (a) means, providing for -

Line 61; after "(e)" and before "a" insert -means, being part of said (b) means, providing for -

Line 64; after "(f)" and before "a" insert -means, being part of said (c) means, providing for -

Col. 7  Line 1; after "means," and before "which" insert -being part of said (a) means, -

Line 4; after "means," and before "which" insert -being part of said (b) means, -

Line 7; after "means," and before "which" insert -being part of said (c) means, -

Line 12; after "means" and before "which" insert -, being part of said (a) means, -

Line 15; after "means," and before "which" insert - being part of said (b) means, -

Line 18; after "means," and before "which" insert - being part of said (c) means, -

UNITED STATES PATENT AND TRADEMARK OFFICE
CERTIFICATE OF CORRECTION

PATENT NO. : 4,494,054

DATED : JANUARY 15, 1985

INVENTOR(S) : GERALD N. PELLEGRINI

It is certified that error appears in the above-identified patent and that said Letters Patent is hereby corrected as shown below:

Col. 7 Line 23; "mechanical" should read -- means providing for mechanical --

Line 26; "mechanical" should read -- means providing for mechanical --

Line 29; "mechanical" should read -- means providing for mechanical --

Line 32; "mechanical" should read -- means providing for mechanical --

Line 47; "an amount at least equal to" should read -- amounts greater than --

Line 57; "an amount of at least equal to" should read -- amounts greater than --

Col. 8 Line 1; after "signal" and before "by" insert --, being part of said (a) controlling act, --

Line 4; after "signal" and before "by" insert --, being part of said (b) controlling act, --

Line 7; after "signal" and before "by" insert --, being part of said (c) controlling act, --

Line 12; after "means" and before "by" insert --, being part of said (a) controlling act, --

Line 15; after "means" and before "by" insert --, being part of said (b) controlling act, --

UNITED STATES PATENT AND TRADEMARK OFFICE
CERTIFICATE OF CORRECTION

PATENT NO. : 4,494,054
DATED : JANUARY 15, 1985
INVENTOR(S) : GERALD N. PELLEGRINI

It is certified that error appears in the above-identified patent and that said Letters Patent is hereby corrected as shown below:

Col. 8 Line 18; after "means" and before "by" insert -, being part of said (c) controlling act, -

Line 23; after "means" and before "by" insert -, being part of said (a) controlling act, -

Line 26; after "means" and before "by" insert -, being part of said (b) controlling act, -

Line 29; after "means" and before "by" insert -, being part of said (c) controlling act, -

Line 61; "an amount of at least equal to" should read - amounts greater than -

Col. 9 Line 3; "an amount of at least equal to" should read - amounts greater than -

Line 15; after "(d)" and before "a" insert -means, being part of said (a) means, providing for -

Line 19; after "(e)" and before "a" insert -means, being part of said (b) means, providing for Line 22; after "(f)" and before "a" insert -means, being part of said (c) means, providing for -

Line 28; after "means," and before "which" insert - being part of said (a) means, -

Col. 10 Line 1; after "means," and before "which" insert -being part of said (b) means, -

UNITED STATES PATENT AND TRADEMARK OFFICE
CERTIFICATE OF CORRECTION

PATENT NO. : 4,494,054

DATED : JANUARY 15, 1985

INVENTOR(S) : GERALD N. PELLEGRINI

It is certified that error appears in the above-identified patent and that said Letters Patent is hereby corrected as shown below:

Col. 10  Line 4; after "means," and before "which" insert -being part of said (c) means, -

Line 9; after "means," and before "which" insert -being part of said (a) means, -

Line 12; after "means," and before "which" insert - being part of said (b) means, -

Line 15; after "means," and before "which" insert - being part of said (c) means, -

Line 16; "signal;" should read - control signal -

Line 20; "mechanical" should read - means providing for mechanical -

Line 23; "mechanical" should read - means providing for mechanical -

Line 26; "mechanical" should read - means providing for mechanical -

UNITED STATES PATENT AND TRADEMARK OFFICE
CERTIFICATE OF CORRECTION

PATENT NO. : 4,494,054

DATED : JANUARY 15, 1985

INVENTOR(S) : GERALD N. PELLEGRINI

It is certified that error appears in the above-identified patent and that said Letters Patent is hereby corrected as shown below:

Col. 10 Line 29; "mechanical" should read – means providing for mechanical –

Line 29; "agnecy" should read – agency –

Signed and Sealed this

Fifteenth Day of October 1985

[SEAL]

Attest:

Attesting Officer

DONALD J. QUIGG

Commissioner of Patents and Trademarks—Designate